United States Patent
Sugiyama et al.

(10) Patent No.: US 8,831,385 B2
(45) Date of Patent: Sep. 9, 2014

(54) MACH-ZEHNDER MODULATOR

(75) Inventors: Masaki Sugiyama, Kawasaki (JP);
Yoshihiko Yoshida, Kawasaki (JP);
Yoshitada Kawashima, Kawasaki (JP);
Toyokazu Sasaki, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 7 days.

(21) Appl. No.: 12/987,306

(22) Filed: Jan. 10, 2011

(65) Prior Publication Data

US 2011/0194802 A1 Aug. 11, 2011

(30) Foreign Application Priority Data

Feb. 10, 2010 (JP) ................................. 2010-027531

(51) Int. Cl.
*G02F 1/01* (2006.01)
*G02B 6/12* (2006.01)

(52) U.S. Cl.
USPC ................................................ 385/1; 385/14

(58) Field of Classification Search
USPC ........................................................ 385/1–3
See application file for complete search history.

(56) References Cited

U.S. PATENT DOCUMENTS

| 5,953,466 | A  * | 9/1999  | Kubota et al. ...................... 385/2 |
| 2002/0006245 | A1 | 1/2002 | Kubota et al. |
| 2005/0265663 | A1 * | 12/2005 | Maruyama et al. ............. 385/47 |
| 2006/0110089 | A1 * | 5/2006 | Ichikawa et al. .................. 385/3 |
| 2007/0053625 | A1 | 3/2007 | Ichioka et al. |
| 2008/0002926 | A1 * | 1/2008 | Kondou et al. .................... 385/2 |
| 2008/0025662 | A1 * | 1/2008 | Kondo et al. ...................... 385/8 |
| 2009/0142015 | A1 * | 6/2009 | Ide et al. ........................... 385/2 |

FOREIGN PATENT DOCUMENTS

| JP | 5-53086 | 3/1993 |
| JP | 10-228006 | 8/1998 |
| JP | 2002-23123 | 1/2002 |
| JP | 2004-46021 | 2/2004 |
| JP | 2006-235380 | 9/2006 |
| JP | 2006-276518 | 10/2006 |
| JP | 2009-134279 | 6/2009 |

OTHER PUBLICATIONS

Japanese Office Action issued May 28, 2013 in corresponding Japanese Application No. 2010-027531.
Japanese Office Action drafted Jun. 19, 2014 in corresponding Japanese Patent Application No. 2010-027531.

* cited by examiner

*Primary Examiner* — Ryan Lepisto
*Assistant Examiner* — Robert Tavlykaev
(74) *Attorney, Agent, or Firm* — Staas & Halsey LLP

(57) ABSTRACT

A mach-zehnder optical modulator includes a substrate having electrooptical effect, wherein: the substrate has an inputting waveguide portion, two intermediate waveguide portions, an outputting waveguide portion and a sub optical waveguide portion, the inputting waveguide portion being branched and coupled to the two intermediate waveguide portions, the two intermediate waveguide portions being combined and coupled to the outputting waveguide portion, the sub optical waveguide being provided on at least one side of the outputting optical waveguide portion and having a given distance from the outputting optical waveguide portion, the sub optical waveguide portion guiding an off-light emitted from a combining portion of the two intermediate waveguide portions; and a width of a starting point of the sub optical waveguide portion is larger than the outputting waveguide portion.

19 Claims, 11 Drawing Sheets

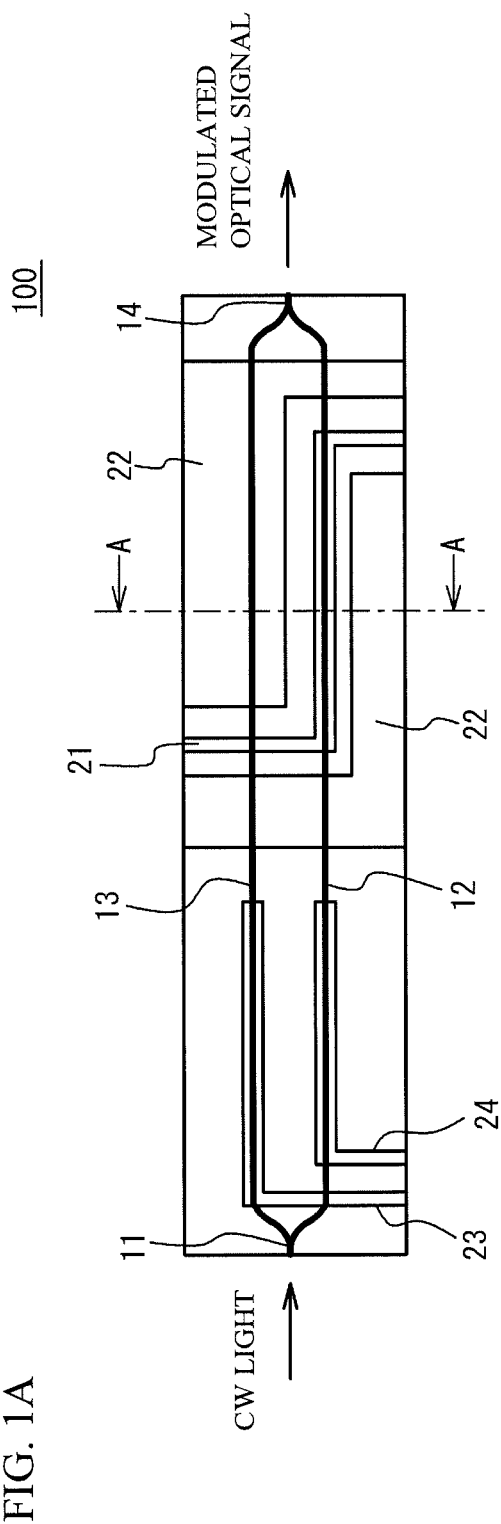
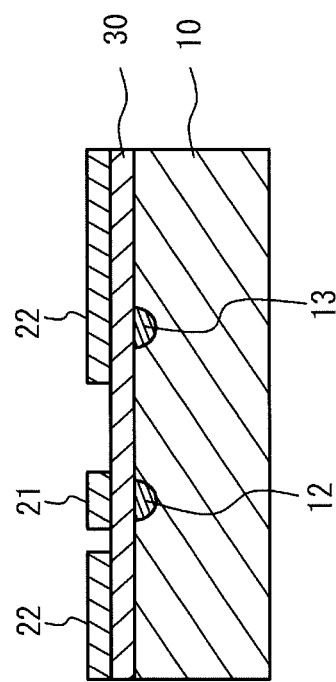
FIG. 1A
FIG. 1B

MACH-ZEHNDER MODULATOR

CROSS-REFERENCE TO RELATED APPLICATION

This application is based upon and claims the benefit of priority of the prior Japanese Patent Application No. 2010-027531, filed on Feb. 10, 2010, the entire contents of which are incorporated herein by reference.

FIELD

A certain aspect of embodiments described herein relates to a mach-zehnder modulator.

BACKGROUND

An optical waveguide device using an electrooptical crystal such as a $LiNbO_3$ (LN) substrate, a $LiTaO_3$ substrate or the like is being developed. For example, the optical waveguide device is used as a mach-zehnder optical modulator. A voltage of an operating point of the mach-zehnder modulator fluctuates according to environmental temperature or the like. Therefore, the voltage of the operating point may be kept constant if an output light is monitored. The output light may be monitored with use of an off-light. Japanese Patent Application Publication No. 05-53086 (hereinafter referred to as Document 1) discloses an art where a sub optical waveguide portion for guiding a radiated light (the off-light) is provided in addition to a waveguide in which a main signal (on-light) transmits.

However, in the art of Document 1, a sub optical waveguide portion having a sharp edge is used in order to guide the off-light to the sub optical waveguide portion efficiently. Manufacturing variation of the edge shape may be a problem in a manufacturing process. The variation of the edge shape of the guide may cause variation of an extinction ratio, monitor-light-receiving sensitivity or the like.

SUMMARY

According to an aspect of the present invention, there is provided a mach-zehnder optical modulator including a substrate having electrooptical effect, wherein: the substrate has an inputting waveguide portion, two intermediate waveguide portions, an outputting waveguide portion and a sub optical waveguide portion, the inputting waveguide portion being branched and coupled to the two intermediate waveguide portions, the two intermediate waveguide portions being combined and coupled to the outputting waveguide portion, the sub optical waveguide being provided on at least one side of the outputting optical waveguide portion and having a given distance from the outputting optical waveguide portion, the sub optical waveguide portion guiding an off-light emitted from a combining portion of the two intermediate waveguide portions; and a width of a starting point of the sub optical waveguide portion is larger than the outputting waveguide portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1A illustrates a schematic plane view of a mach-zehnder type optical modulator in accordance with a first embodiment;

FIG. 1B illustrates a cross sectional view taken along a line A-A of FIG. 1A;

DESCRIPTION OF EMBODIMENTS

Figure 2A:
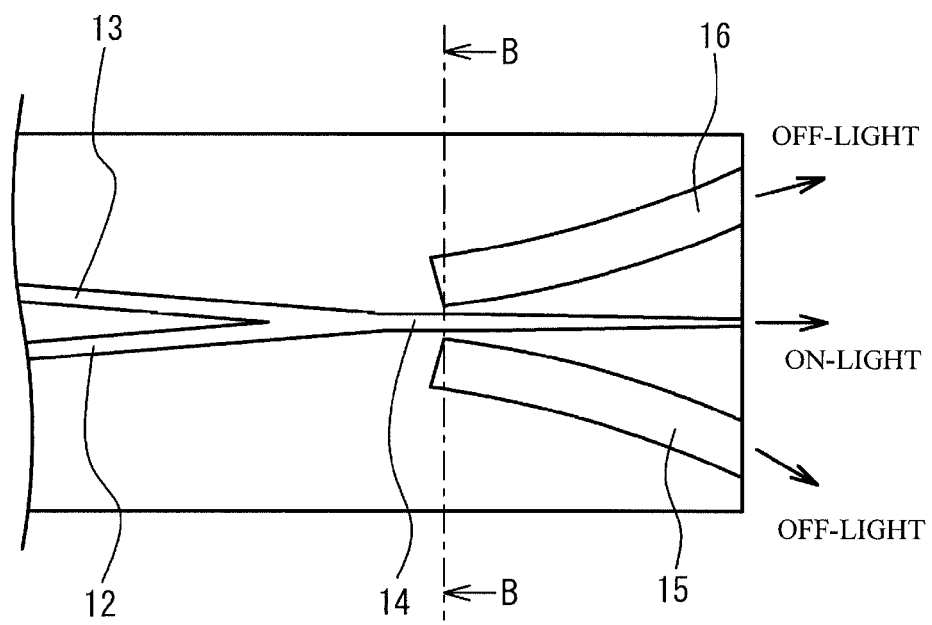
FIG. 2A illustrates an enlarged plane view around an outputting waveguide portion.

The following is a description of embodiments of the present invention, with reference to the accompanying drawings.

[a] First Embodiment

FIG. 1A illustrates a schematic plane view of a mach-zehnder type optical modulator 100 in accordance with a first embodiment. FIG. 1B illustrates a cross sectional view taken along a line A-A of FIG. 1A. As illustrated in FIG. 1A, the optical modulator 100 has a substrate 10 in which an inputting waveguide portion 11, intermediate waveguide portions 12 and 13, and an outputting waveguide portion 14 are formed. The substrate 10 is an electrooptical substrate including an electrooptical crystal such as $LiNbO_3$ (LN) substrate or $LiTaO_3$ substrate.

The inputting waveguide portion 11, the intermediate waveguide portions 12 and 13, and the outputting waveguide portion 14 are formed through thermal diffusion of a metal such as Ti into the substrate 10. The inputting waveguide portion 11 is coupled to the intermediate waveguide portions 12 and 13 via a Y-shape branching portion. The intermediate waveguide portions 12 and 13 are arranged in parallel with each other, and are coupled to the outputting waveguide portion 14 via a Y-shape combining portion. Thus, the inputting waveguide portion 11, the intermediate waveguide portions 12 and 13 and the outputting waveguide portion 14 form an optical signal waveguide.

As illustrated in FIG. 1B, there is provided a buffer layer 30 on a face of the substrate 10 on the optical signal waveguide side. Thus, the optical signal waveguide is covered with the buffer layer 30. The buffer layer 30 is provided to prevent absorption of a light transmitting in the optical signal waveguide into an electrode described later. The buffer layer 30 is, for example, made of $SiO_2$ or the like having a thickness of 0.2 μm to 2 μm.

There are provided a signal electrode 21 and a ground electrode 22 above the intermediate waveguide portions 12 and 13. The buffer layer 30 is located between the intermediate waveguide portion 12 and the signal electrode 21 and between the intermediate waveguide portion 13 and the ground electrode 22. Thus, the signal electrode 21 and the ground electrode 22 form a coplanar electrode. Each of the above electrodes is provided directly above the waveguide in order to use refraction index changing caused by an electrical field in a Z-direction, if a Z-cut substrate is used as the substrate 10.

When the optical modulator 100 is operated with high speed, a traveling-wave electrode is structured by coupling a dead end of the signal electrode 21 to a dead end of the ground electrode 22 through a resistor, and a microwave signal is applied to the traveling-wave electrode from an inputting side. In this case, refraction index of the intermediate waveguide portions 12 and 13 changes according to the generated electrical field. Thus, a phase difference between the intermediate waveguide portions 12 and 13 changes, and a mach-zehnder interference is established. Accordingly, an intensity-modulated optical signal is output from the outputting waveguide portion 14. An effective refraction index of the microwave may be controlled by changing a cross section shape of the traveling-wave electrode. High-speed optical responsiveness may be obtained by matching the speed of the optical signal and that of the microwave.

There are provided DC electrodes 23 and 24 for bias adjusting on the intermediate waveguide portions 12 and 13 in addition to the signal electrode 21 and the ground electrode 22. A voltage at an operating point of a mach-zehnder modulator fluctuates according to environmental temperature. The voltage at the operating point is a voltage at which an optical signal is not output. However, the voltage of the operating point of the optical modulator 100 may be kept constant, when a bias voltage is applied to the DC electrodes 23 and 24 according to optical intensity of an output optical signal from the optical modulator 100 with a low-frequency signal being applied to the DC electrode 23 and 24.

The present inventors have searched a structure that secures reliability, downsizes an optical modulator, and reduces a voltage. It was mainly thought that reduction of a drive voltage Vπ of a unit length and shortening of a mutual action portion were effective for keeping of the lower voltage and downsizing of the optical modulator. The present inventors do not focus on the mutual action portion but on a monitor portion of an output optical signal. First, the inventors focus on a manufacturing accuracy of a starting point of a sub optical waveguide portion that has not been searched well.

Figure 2B:
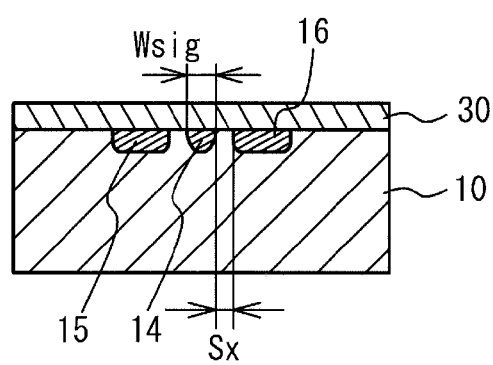
FIG. 2B illustrates a cross sectional view taken along a line B-B of FIG. 2A.

FIG. 2A and FIG. 2B illustrate an enlarged view around the outputting waveguide portion 14. FIG. 2A illustrates an enlarged plane view around the outputting waveguide portion 14. FIG. 2B illustrates a cross sectional view taken along a line B-B of FIG. 2A. As illustrated in FIG. 2A and FIG. 2B, there is provided a sub optical waveguide portion 15 on one side of the outputting waveguide portion 14, and there is provided another sub optical waveguide portion 16 at the other side of the outputting waveguide portion 14. The sub optical waveguide portions 15 and 16 have a given distance from the outputting waveguide portion 14. The sub optical waveguide portions 15 and 16 act as a guide for an off-light emitted from the Y-shape combining portion at which the intermediate waveguide portions 12 and 13 are combined.

A minimum distance between the sub optical waveguide portions 15 and 16 and the outputting waveguide portion 14 is referred to as a gap "Sx". A width of the outputting waveguide portion 14 at a starting point of the sub optical waveguide portions 15 and 16 is referred to as a width "Wsig". The width of the sub optical waveguide portions 15 and 16 is formed to be larger than the width "Wsig". The width of the outputting waveguide portion 14 is reduced gradually from the starting point of the sub optical waveguide portions 15 and 16 toward a latter side thereof.

Figure 3:
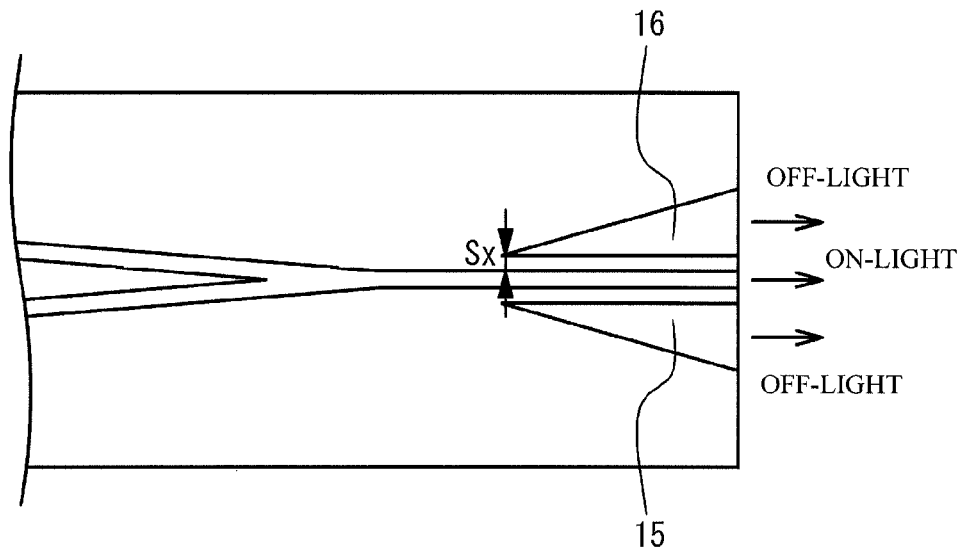
FIG. 3 illustrates a plane view around an outputting waveguide portion of an optical modulator in accordance with a first comparative embodiment.

Here, a description will be given of a first comparative embodiment in order to clarify the effect of the optical modulator 100 in accordance with the first embodiment. FIG. 3 illustrates a plane view around an outputting waveguide portion of the optical modulator in accordance with the first comparative embodiment. In FIG. 3, the sub optical waveguide portions 15 and 16 have a pointed shape at the starting point thereof. In this case, the off-light is guided to the sub optical waveguide portions 15 and 16 efficiently. However, the structure has a problem of the manufacturing accuracy of the edge of the sub optical waveguide portions 15 and 16 in a manufacturing process thereof.

The sub optical waveguide portions 15 and 16 are formed with a method in which a metal such as Ti is thermally diffused into a part of a crystal substrate. When the method is used, the edge may be chipped or rounded in a process such as exposing process of a resist, developing process of the resist or etching process of a metal film, even if a mask pattern having a sharp edge is used. The shape of the edge depends on a condition of resist coating, optical power in the exposing process, a condition of baking of the resist, etchant temperature in the etching process, a speed of a stirrer. The edge shape fluctuates dynamically according to a slight changing of the conditions. The fluctuation of the edge shape differs according to each wafer. Even in a single wafer, the edge shape around the center of the wafer may be different from another edge around the circumference of the wafer. As a result, the edge shape of the sub optical waveguide portions 15 and 16 differs according to each wafer or each chip. The combining efficiency of the off-light to the sub optical waveguide portions 15 and 16 depends on the width or angle of the edge of the sub optical waveguide portions 15 and 16. The influence of the edge shape differs according to the wavelength of the light. Therefore, the variation of the edge shape may cause the variation of the extinction ratio, the monitor-light-receiving sensitivity, or the like. And the variation of the edge shape may cause the variation of the wavelength characteristics.

In contrast, in the optical modulator 100, the width of the sub optical waveguide portions 15 and 16 at the starting point thereof is larger than the outputting waveguide portion 14. In this case, the manufacturing accuracy of the sub optical waveguide portions 15 and 16 is improved. Therefore, the fluctuation of the edge shape of the sub optical waveguide portions 15 and 16 depending on the manufacturing condition is restrained, and characteristics variation caused by the manufacturing variation is restrained. Combining efficiency of the off-light to the sub optical waveguide portions 15 and 16 may be maintained, because the width of the starting point of the sub optical waveguide portions 15 and 16 is relatively large.

It is preferable that the sub optical waveguide portions 15 and 16 have a width allowing multi-mode at the starting point thereof. In this case, the off-light may be combined with a high-order mode of the sub optical waveguide portions 15 and 16 even if the off-light may not be combined with a base mode of the sub optical waveguide portions 15 and 16. Thus, a sufficient combining efficiency may be obtained if the combining efficiency of the high-order mode is considered in addition to the base mode. The multi-mode may be obtained when the width of the waveguide is 10 μm or more with respect to a light of C-band, although required width of the waveguide differs according to a wavelength.

Mode field may fluctuate when the sub optical waveguide allowing the multi-mode is used, because transmission speed of a low-order mode is different from that of a high-order mode, and a phase difference of the low-order mode between the inputting portion and the outputting portion is different from that of the high-order mode. In this case, mode dispersion may be a new problem. However, the problem may be solved when the width and the length of the sub optical waveguide is designed so that the shape of the inputting portion reappears.

In the optical modulator in accordance with the first comparative embodiment, an area where the outputting waveguide portion 14 is in parallel with the sub optical waveguide portions 15 and 16 may cause the characteristics variation. As illustrated in FIG. 3, in the area, the outputting waveguide portion 14 has a gap "Sx" from the sub optical waveguide portions 15 and 16. The gap "Sx" is set to be a value so that the high-order mode (the off-light) is combined with the sub optical waveguide portions 15 and 16, and the base mode (on-light) is not combined with the sub optical waveguide portion 15 or 16. When the gap "Sx" is smaller than an adequate setting value, loss of the on-light may increase. On the other hand, when the gap "Sx" is large, the combining efficiency of the off-light may be reduced, an extinction ration may be degraded, and light-receiving sensitivity may be degraded.

The characteristics of the optical modulator is sensible to the gap "Sx". In particular, the combining efficiency of the off-light to the sub optical waveguide portions 15 and 16 fluctuates dynamically according to the gap "Sx". The gap "Sx" depends on a patterning condition, an etching condition or the like, as well as the edge shape of the sub optical waveguide portions 15 and 16. The gap "Sx" may differ according to a wafer or a chip. Thus, there may be characteristics variation and degradation of a yield rate.

The parallel area where the outputting waveguide portion 14 is in parallel with the sub optical waveguide portions 15 and 16 may cause a problem of wavelength characteristics. The longer the wavelength of the transmitting light is, the larger the combining efficiency of the base mode and the high-order mode to the sub optical waveguide portions 15 and 16 is. Therefore, the light-receiving sensitivity of a monitored light is increased, and loss of the on-light is increased. In other words, an adequate value of the gap differs according to each wavelength. Accordingly, desirable characteristics may be obtained only around a designed wavelength. And, required condition may not be satisfied at a wavelength away from the designed wavelength even if the manufacturing condition is changed only a little.

It is necessary to improve manufacturing process accuracy, repeatability or the like of a waveguide or to add a high-accuracy process in addition to the waveguide manufacturing, in order to solve the manufacturing condition. In this case, it is necessary to control environment such as temperature, humidity or like in the process, to adjust thickness of a metal film, resist or the like, to control light-emitting condition during the patterning or the like. It is therefore necessary to control devices at all points. This results in cost-up because of addition of facility and the controls.

In addition to the problem of the manufacturing accuracy, the optical modulator in accordance with the first comparative embodiment has a problem of size. The structure, in which the outputting waveguide and the sub optical waveguide are in parallel with each other, uses directional coupling of both sub optical waveguides. Therefore, the area where the outputting waveguide is in parallel with the sub optical waveguide needs a length of approximately a few tens mm in order to combine the high-order mode to the sub optical waveguide perfectly. Accordingly, it is necessary to elongate the chip in order to use the area where the outputting waveguide is in parallel with the sub optical waveguide. Actually, the combining efficiency is abandoned, and the length of the chip is designed to be shorter than the perfect coupling length. However, the length of approximately 10 mm is at least needed in order to obtain the effect of the sub optical waveguide. It is necessary to shorten the mutual activity portion in order to set the length of 10 mm in a chip having a limited size. This results in another problem of increase of the drive voltage.

The size problem may be caused by a portion where the distance between the off-light and the on-light is enlarged. In the optical modulator in accordance with the first comparative embodiment, the width of the sub optical waveguide portions 15 and 16 is enlarged in a tapered shape, and the mode field of the off-light is enlarged. Thus, the distance between the on-light and the off-light is substantially enlarged. In the structure, a distance between a center of the off-light and the on-light gets larger gradually. However, the gap "Sx" between the sub optical waveguide portions 15 and 16 and the outputting waveguide portion 14 is constant from the starting point to the edge face. Therefore, the minimum distance between the outputting waveguide portion 14 and the sub optical waveguide portions 15 and 16 fails to fluctuate. In this case, a part of the off-light transmitting in the sub optical waveguide portions 15 and 16 is left near the outputting waveguide portion 14. The off-light near the outputting waveguide portion 14 interferes with the on-light after being output from the edge face, and degrades the extinction ratio of the on-light.

In order to improve the extinction ratio, it is important to enlarge the distance between the off-light and the on-light before reaching the edge face. A curved portion may be formed at the latter portion of the parallel portion, as well as the optical modulator in accordance with a second comparative embodiment of FIG. 4. In the optical modulator of the second comparative embodiment, the sub optical waveguide portions 15 and 16 is curved at curvature radius R so that the distance between the sub optical waveguide portions 15 and 16 and the outputting waveguide portion 14 is enlarged. In the optical modulator of the second comparative embodiment, the sub optical waveguide portions 15 and 16 is curved 90 degrees at the curvature radius R, and the off-light is emitted from a side face of the chip.

Figure 4:
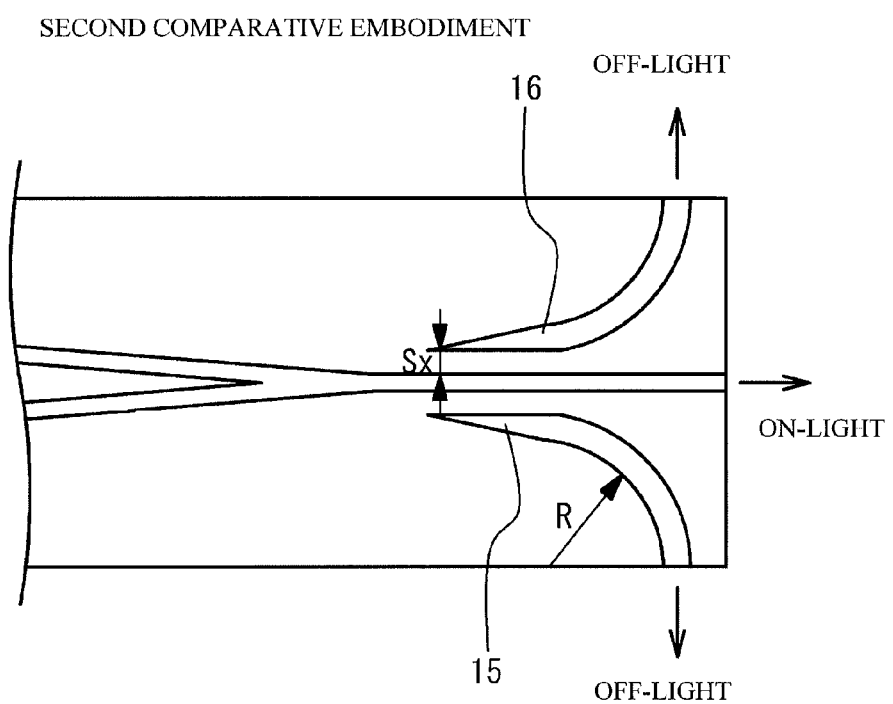
FIG. 4 illustrates a plane view around an outputting waveguide portion of an optical modulator in accordance with a second comparative embodiment.

The curved sub optical waveguide portion of FIG. 4 may affect on the chip size. It is preferable that the curvature radius R of the sub optical waveguide is reduced in order to keep the chip size. However, the off-light transmitting in the sub optical waveguide is radiated when the curvature radius R is reduced. This may result in the degradation of the extinction ratio, reduction of the monitored optical intensity or the like. When the sub optical waveguide portion is curved 90 degrees as illustrated in FIG. 4, the width of the chip is 2 R or more. Therefore, the width of the chip is 4 mm or more, even if the curvature radius R is reduced to 2 mm Generally, the width of the chip is approximately 1 mm to 3 mm. The number of the chip made from a single wafer may be reduced when the width of the chip is 4 mm or more, and a piece rate of the chip may increase.

It is therefore necessary to provide a sub optical waveguide having small radiation loss and having small curvature radius R. International Publication WO2006/090863 supposes a method of reducing a thickness of a substrate. When the thickness of the substrate is 20 μm or less, the waveguide acts as a slab waveguide. In this case, the sub optical waveguide portion may be curved with low loss, even if the curvature radius is 5 mm.

However, the thickness of a wafer that is available in the market is generally 0.5 mm to 1 mm. The wafer may be subjected to a whole area grinding, a machining process, an excimer laser process, a sandblast process or the like in order to reduce the thickness of the wafer to 20 μm. However, a problem with respect to the reliability during the process or after the process is left. For example, there is left a problem that a thin portion of the substrate tends to be broken. It is necessary to take measures to the mass production with respect to the partial process. The restraint of the cost-up caused by the new process is a problem.

Process technology is being developed. On the other hand, the demand for the improvement of the characteristics of the optical modulator is recently being enhanced speedily. As a background, there is a demand for downsizing of a component mounted on a communication device as a package is standardized. There is a demand for downsizing a package of the optical modulator. In particular, a LN modulator has an important problem of shortening. The changing of the modulation method is another background. The drive voltage is being transferred from conventional Vπ to 2Vπ as the modulation method is transferred from NRZ modulation to DPSK modulation. The performance of the driver amplifier is being improved and the output of the driver amplifier gets higher in order to follow the transferring. However, there is a strong demand for reduction of the drive voltage of the optical modulator. Therefore, the reduction of the drive voltage Vπ is an important problem.

The rest problem is a division of the off-light and the on-light. It is thought that the radiation loss of the sub optical waveguide having small curvature radius R is reduced by reducing the thickness of the substrate. However, there is a problem in reliability during the processing. Division of the off-light from the on-light without reducing the thickness of the substrate with process is needed in order to secure the reliability. The present inventors have searched an alternative solution. For example, as illustrated in FIG. 2, the sub optical waveguide portions 15 and 16 are at an angle with the outputting waveguide portion 14 at the starting point thereof so that the distance between the sub optical waveguide portions 15 and 16 and the outputting waveguide portion 14 gets larger. With the structure, the curvature radius R may be 5 mm or more. Thus, the on-light is divided from the off-light with a relatively short transmission distance even if the thickness of the substrate is 20 μm or more.

The optical modulator 100 is different from the optical modulators in accordance with the first and second comparative embodiments, and does not have the parallel area where the sub optical waveguide portions 15 and 16 are in parallel with the outputting waveguide portion 14. And so, in the optical modulator 100, the minimum distance (the gap "Sx") between the outputting waveguide portion 14 and the sub optical waveguide portions 15 and 16 is set to be less than 10 μm. Thus, the combining efficiency is compensated.

In the optical modulator 100 in accordance with the first embodiment, the distance between the on-light and the off-light is enlarged with a short transmission distance. Therefore, both the downsizing of the chip and the extinction ratio are improved, without reducing the thickness of the substrate 10 to 20 μm or less. It is therefore preferable that the thickness of the substrate 10 is more than 20 μm. In this case, the breaking of the substrate 10 is restrained. And cost increase is restrained because high process accuracy is not needed.

The material of the optical signal waveguide may be different from that of the sub optical waveguide portions 15 and 16. However, it is preferable that the material of the optical signal waveguide is the same as that of the sub optical waveguide portions 15 and 16. In this case, the optical signal waveguide and the sub optical waveguide portions 15 and 16 are formed in a single process. Therefore, the manufacturing process is simplified. It is preferable that the curvature radius of the sub optical waveguide portions 15 and 16 is 5 mm or more. In this case, the radiation loss is restrained.

The point of the sub optical waveguide portions 15 and 16 to which the off-light is radiated is the single-mode area that is after the Y-shape combining portion and the width is reduced. It is therefore preferable that the starting point of the sub optical waveguide portions 15 and 16 is adjacent to a starting point of the width reduction portion of the outputting waveguide portion 14. It is preferable that the width Wsig of the outputting waveguide portion 14 at the starting point of the sub optical waveguide portions 15 and 16 is 4 μm to 7 μm, considering the waveguide width allowing the cut-off of the high-order mode. In this case, there is a problem that the waveguide width allowing the cut-off differs according to the wavelength of the light. And so, it is preferable that the changing rate of the width of the outputting waveguide portion 14 at the starting point of the sub optical waveguide portions 15 and 16 is 2 μm or more per 1 mm in the transmission direction.

In the optical modulator 100 of the embodiment, the sub optical waveguide for the off-light is provided on each side of the outputting waveguide portion 14. However, the off-light may be monitored even if only one of the sub optical waveguide portions is provided. Therefore, at least one of the sub optical waveguide portions 15 and 16 only has to be provided. Here, the extinction ratio is improved when the distance between the on-light and the off-light is enlarged. However, it is preferable that the off-lights transmit symmetrically with respect to the center axis of the on-light, in order to improve the extinction ratio further. It is therefore preferable that the sub optical waveguide portion is provided on each side of the outputting waveguide portion 14, similarly to the optical modulator 100.

It is preferable that the starting point of the sub optical waveguide portion 15 is the same as that of the sub optical waveguide portion 16 in the transmission direction of an optical signal, from a view point of improvement of the extinction ratio. It is preferable that the width of the starting point of the sub optical waveguide portion 15 is the same as that of the sub optical waveguide portion 16. It is preferable that the distance between the sub optical waveguide portion 15 and the outputting waveguide portion 14 is the same as that between the sub optical waveguide portion 16 and the outputting waveguide portion 14. It is preferable that the angle between the sub optical waveguide portion 15 and the outputting waveguide portion 14 is the same as that between the sub optical waveguide portion 16 and the outputting waveguide portion 14.

Second Embodiment

Figure 5A:
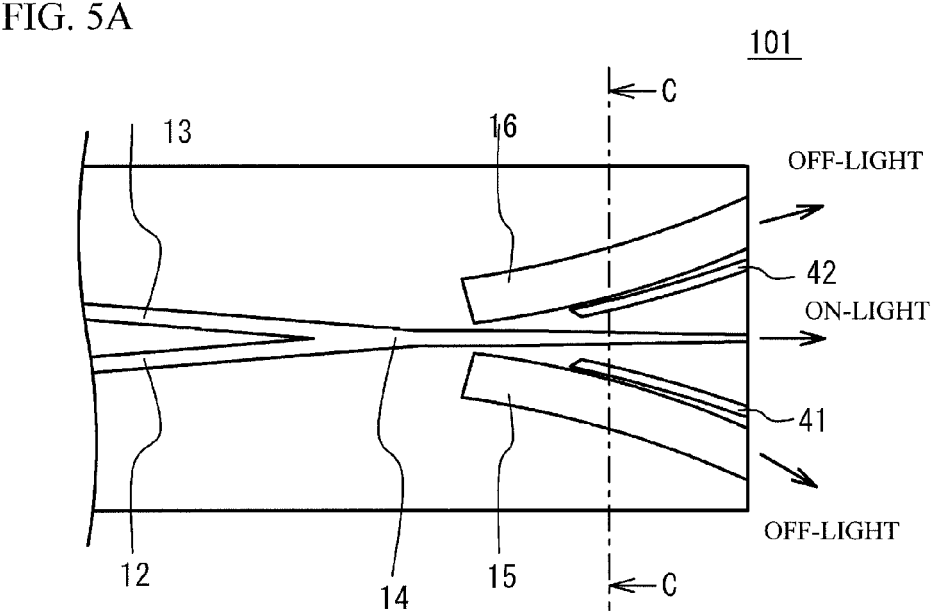
FIG. 5A illustrates a schematic plane view of an optical modulator in accordance with a second embodiment.
Figure 5B:
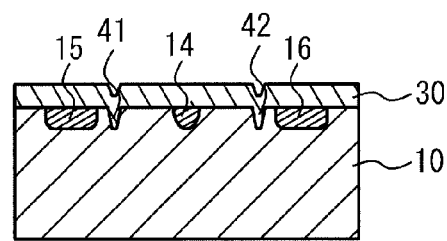
FIG. 5B illustrates a cross sectional view taken along a line C-C of FIG. 5A.

FIG. 5A illustrates a schematic plane view of an optical modulator 101 in accordance with a second embodiment. As illustrated in FIG. 5A, in the optical modulator 101, a groove 41 is formed between the sub optical waveguide portion 15 and the outputting waveguide portion 14. A groove 42 is formed between the sub optical waveguide portion 16 and the outputting waveguide portion 14. The groove 41 extends along the sub optical waveguide portion 15. The groove 42 extends along the sub optical waveguide portion 16. FIG. 5B illustrates a cross sectional view taken along a line C-C of FIG. 5A. As illustrated in FIG. 5B, the buffer layer 30 fills the groove 41 and the groove 42. The buffer layer 30 may not be formed in the grooves 41 and 42.

Here, the high-order mode tends to be radiated at a curved portion of the sub optical waveguide portion, if the sub optical waveguide portion for the off-light allows the multi-mode. However, interference of the high-order mode to the on-light is restrained when the groove is formed between the sub optical waveguide portions 15 and 16 and the outputting waveguide portion 14.

The wavelength dependency of the mode field at the high-order mode is increased when the sub optical waveguide portions 15 and 16 are a multi-mode waveguide. In this case, when the groove is depthless, the effect of the groove differs according to the wavelength of the off-light. And so, it is preferable that the depth of the grooves 41 and 42 is 3 μm or more, when the mode field diameter is considered.

Third Embodiment

Figure 6:
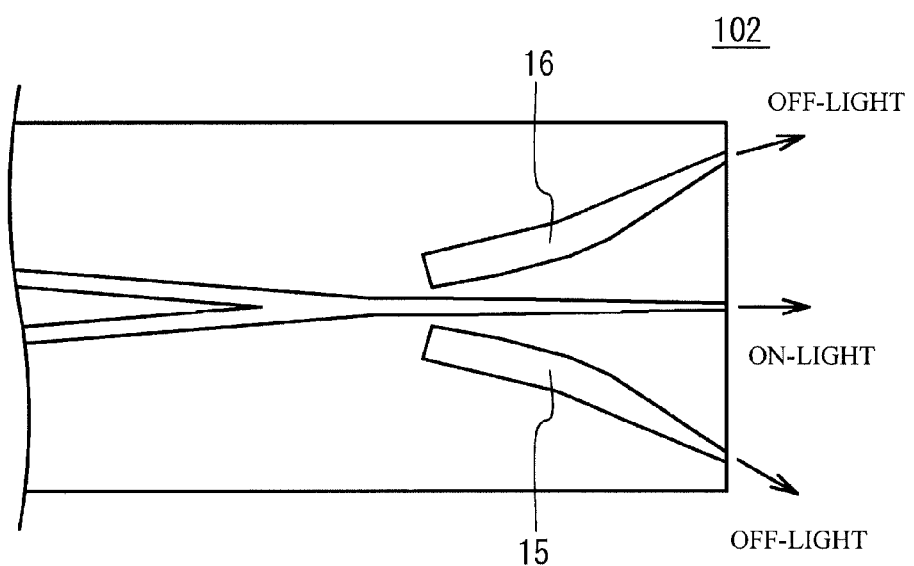
FIG. 6 illustrates a schematic plane view of an optical modulator in accordance with a third embodiment.

FIG. 6 illustrates a schematic plane view of an optical modulator 102 in accordance with a third embodiment. As illustrated in FIG. 6, in the optical modulator 102, the width of the sub optical waveguide portions 15 and 16 is reduced gradually in a tapered shape in the transmission direction of the off-light. In this case, the combining efficiency between the off-light and the light-receiving element is improved, if the off-light is used as a monitored light having reversed phase.

Modified Embodiment

Figure 7:
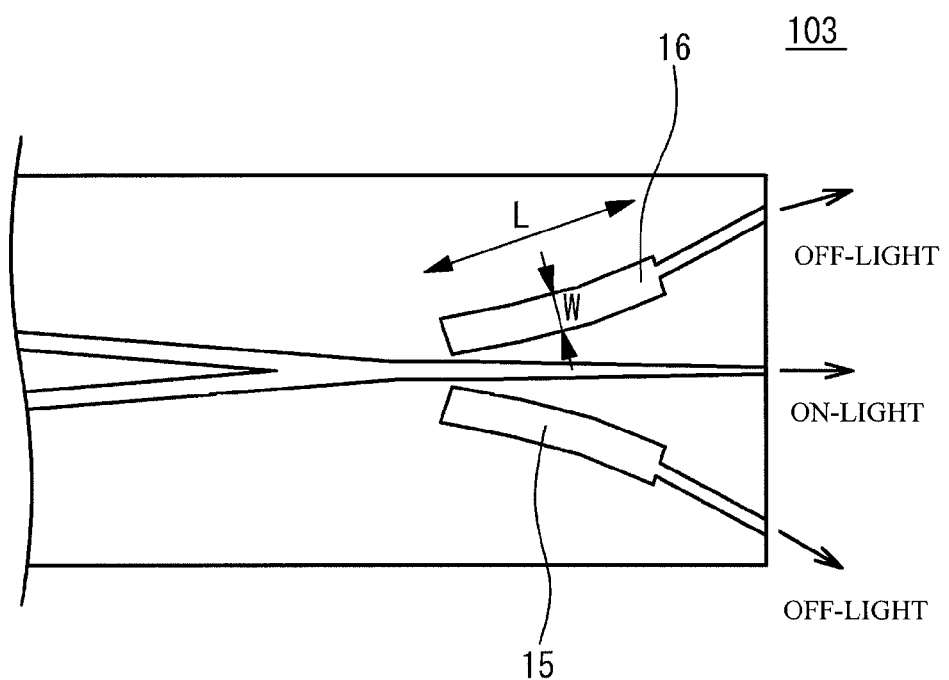
FIG. 7 illustrates a schematic plane view of an optical modulator in accordance with a modified embodiment of the third embodiment.

FIG. 7 illustrates a schematic plane view of an optical modulator 103 in accordance with a modified embodiment of the third embodiment. As illustrated in FIG. 7, in the optical modulator 103, the width of the sub optical waveguide portions 15 and 16 is reduced discontinuously in the transmission direction of the off-light. In this case, the combining efficiency between the off-light and the light-receiving element is improved, if the off-light is used as a monitored light having reversed phase.

However, it is preferable that the mode field of the starting point of the sub optical waveguide portions 15 and 16 focuses into a mirror image at the point where the width of the sub optical waveguide is reduced. And so, it is preferable that the width of the sub optical waveguide portions 15 and 16 is determined so that the following equation (1) is satisfied.

$$L \text{ is similar equal to } N \cdot (4nW^2/\lambda) \quad (1)$$

N: integer
N: effective refraction index of the sub optical waveguide portion
W: width of the starting point of the sub optical waveguide portions 15 and 16
λ: wavelength of the off-light
L: length of a portion of the sub optical waveguide portions 15 and 16 having the width W

Fourth Embodiment

Figure 8:
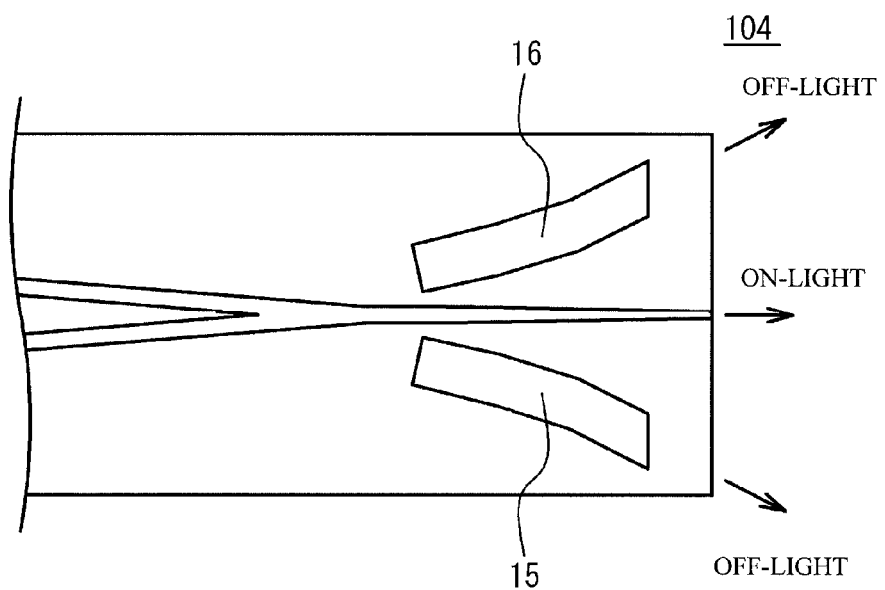
FIG. 8 illustrates a schematic plane view of an optical modulator in accordance with a fourth embodiment.

When the sub optical waveguide portion for the off-light allows the multi-mode, the effect of light-confining is enhanced. Thus, the position of the on-light is approximately the same as that of the off-light in a direction at right angles with the substrate 10. In this case, the off-light may interfere with the on-light. And so, in the fourth embodiment, a description will be given of a structure in which interference of the off-light with the on-light is restrained. FIG. 8 illustrates a schematic plane view of an optical modulator 104 in accordance with the fourth embodiment. As illustrated in FIG. 8, in the optical modulator 104, the sub optical waveguide portions 15 and 16 fail to extend to the edge face. That is, the sub optical waveguide portions 15 and 16 terminate before reaching the edge face. In this case, the off-light is guided downward (the opposite side of the buffer layer 30). Thus, the interference of the off-light with the on-light is restrained.

First Modified Embodiment

Figure 9A:
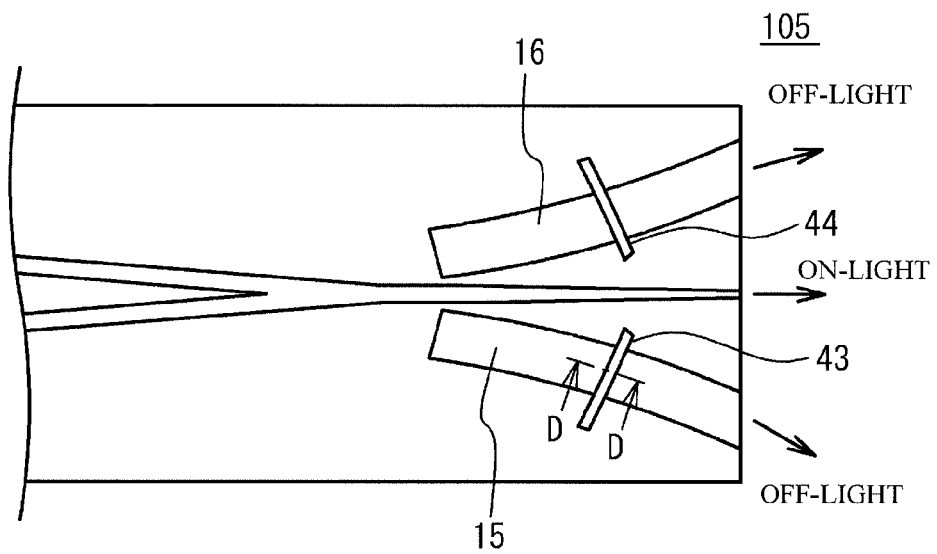
FIG. 9A illustrates a schematic plane view of an optical modulator in accordance with a first modified embodiment of the fourth embodiment.
Figure 9B:
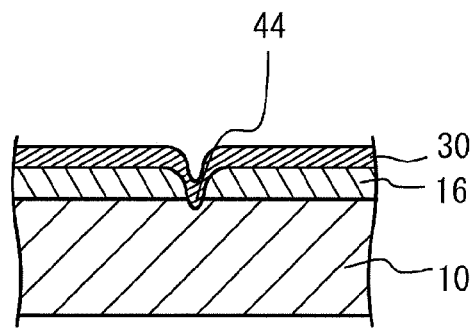
FIG. 9B illustrates a cross sectional view taken along a line D-D of FIG. 9A.

FIG. 9A illustrates a schematic plane view of an optical modulator 105 in accordance with a first modified embodiment of the fourth embodiment. FIG. 9B illustrates a cross sectional view taken along a line D-D of FIG. 9A. As illustrated in FIG. 9A and FIG. 9B, in the optical modulator 105, the sub optical waveguide portions 15 and 16 extend to the edge face of the substrate. However, the grooves 43 and 44 are formed in the middle of the sub optical waveguide portions 15 and 16 at approximately right angles with the transmission direction of the off-light. In this case, the off-light is guided downward (on the opposite side of the buffer layer 30). Thus, the interference of the off-light with the on-light is restrained.

Second Modified Embodiment

Figure 10:
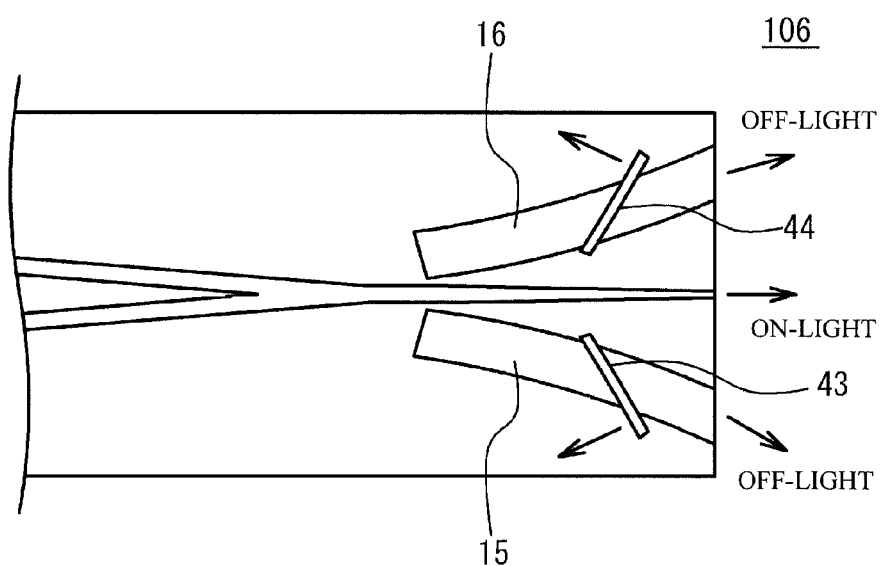
FIG. 10 illustrates a schematic plane view of an optical modulator in accordance with a second modified embodiment of the fourth embodiment.

FIG. 10 illustrates a schematic plane view of an optical modulator 106 in accordance with a second modified embodiment of the fourth embodiment. In the optical modulator 106, the grooves 43 and 44 are formed to be inclined so that the off-light is reflected toward the opposite side of the outputting waveguide portion 14. In this case, the interference of the reflected off-light with the on-light is restrained.

In the fourth embodiment, the mode field at the high-order mode depends on the wavelength more, when the sub optical waveguide portions 15 and 16 are a multi-mode waveguide. In this case, the effect of the groove may differ according to the wavelength of the off-light when the groove is depthless. And so, it is preferable that the grooves 43 and 44 have the depth of 3 μm or more, considering the mode field diameter.

Fifth Embodiment

Figure 11:
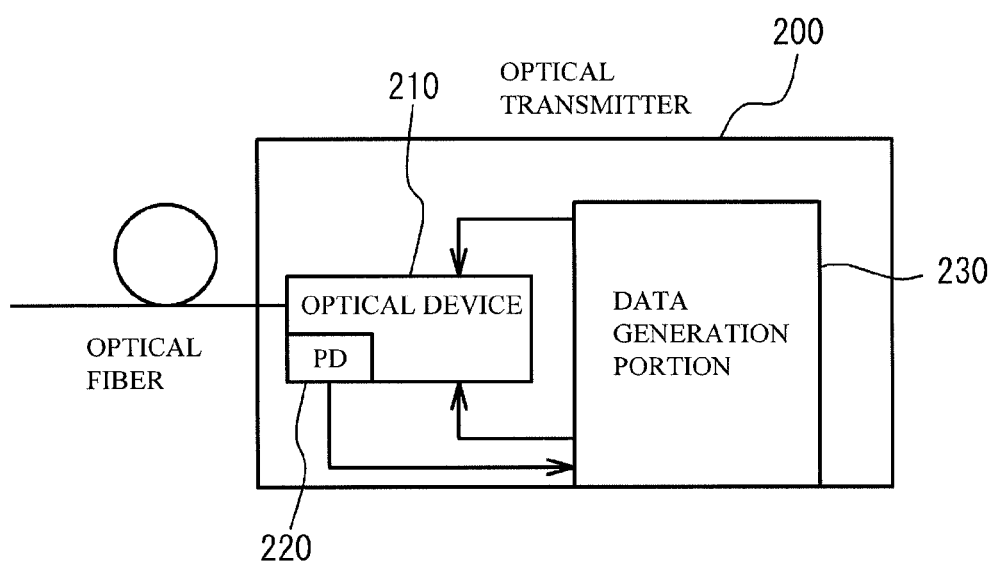
FIG. 11 illustrates a block diagram of an optical transmitter in accordance with a fifth embodiment.

FIG. 11 illustrates a block diagram of an optical transmitter 200 in accordance with a fifth embodiment. As illustrated in FIG. 11, the optical transmitter 200 has an optical device 210, a light-receiving element 220, a data generation portion 230, and so on. The optical device 210 is a semiconductor laser having one of the above-mentioned optical modulators. The data generation portion 230 transmits a drive signal for driving the optical device 210 to the optical device 210. The optical device 210 outputs a modulated optical signal according to the drive signal from the data generation portion 230. The output modulated optical signal is output outside via an optical fiber or the like. The light-receiving element 220 receives the off-light of the modulated optical signal, and transmits the reception result to the data generation portion 230. The optical modulator mounted on the optical device 210 is downsized and has high extinction ratio. Therefore, the optical transmitter 200 outputs an optical signal having high characteristics.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A mach-zehnder optical modulator comprising
a substrate having electrooptical effect,
wherein:
the substrate has an inputting waveguide portion, two intermediate waveguide portions, an outputting waveguide portion and a sub optical waveguide portion, the inputting waveguide portion being branched and coupled to the two intermediate waveguide portions, the two intermediate waveguide portions being combined and coupled to the outputting waveguide portion, the sub optical waveguide portion being provided on at least one side of the outputting optical waveguide portion and having a given distance from the outputting optical waveguide portion, the sub optical waveguide portion guiding an off-light emitted from a combining portion of the two intermediate waveguide portions;
an end face of the sub optical waveguide portion at a starting point is at a non-perpendicular angle with respect to the outputting waveguide portion and is configured so that a distance between the sub optical waveguide portion and the outputting waveguide portion increases in a transmission direction of an on-light; and
a width of the end face of the sub optical waveguide portion is larger than that of the outputting waveguide portion.

2. The mach-zehnder optical modulator as claimed in claim 1, wherein the substrate having the electrooptical effect has a thickness of more than 20 μm.

3. The mach-zehnder optical modulator as claimed in claim 1, wherein a gap between the sub optical waveguide portion and the outputting waveguide portion at the starting point of the sub optical waveguide portion is less than 10 μm.

4. The mach-zehnder optical modulator as claimed in claim 1, wherein a groove is formed between the outputting waveguide portion and the sub optical waveguide portion.

5. The mach-zehnder optical modulator as claimed in claim 1, wherein the sub optical waveguide portion curves so that a distance of the sub optical waveguide portion and the outputting waveguide portion increases.

6. The mach-zehnder optical modulator as claimed in claim 5, wherein a curvature radius of the sub optical waveguide portion is 5 mm or more.

7. The mach-zehnder optical modulator as claimed in claim 1, wherein a width of the sub optical waveguide portion decreases gradually or in stages in a transmission direction of the off-light.

8. The mach-zehnder optical modulator as claimed in claim 1, wherein the sub optical waveguide portion terminates before reaching an edge face of the substrate.

9. The mach-zehnder optical modulator as claimed in claim 1, wherein a groove is formed across the sub optical waveguide portion in a width direction of the sub optical waveguide portion.

10. The mach-zehnder optical modulator as claimed in claim 9, wherein the groove is inclined with respect to a transmission direction of the off-light so that the off-light is reflected toward an opposite side of the outputting waveguide portion.

11. The mach-zehnder optical modulator as claimed in claim 9, wherein the groove has a depth of 3 μm or more.

12. The mach-zehnder optical modulator as claimed in claim 1, wherein a width of the outputting waveguide portion at the starting point of the sub optical waveguide portion is 4 μm to 7 μm.

13. The mach-zehnder optical modulator as claimed in claim 1, wherein a material of the outputting waveguide portion is the same as that of the sub optical waveguide portion.

14. The mach-zehnder optical modulator as claimed in claim 1, wherein:
the outputting waveguide portion has a part in which a width fluctuates in a transmission direction of an on-light; and
the starting point of the sub optical waveguide portion is adjacent to the part in which the width fluctuates.

15. The mach-zehnder optical modulator as claimed in claim 14, wherein a changing rate of a width of the outputting waveguide portion is 2 μm or more per 1 mm in the transmission direction of the on-light.

16. The mach-zehnder optical modulator as claimed in claim 1, wherein the sub optical waveguide portion is formed symmetrically with respect to a center of the outputting waveguide portion on each side of the outputting waveguide portion.

17. The mach-zehnder optical modulator as claimed in claim 16, wherein starting points of the two sub optical waveguide portions are equal to each other in a transmission direction of the on-light of the outputting waveguide portion.

18. The mach-zehnder optical modulator as claimed in claim 16, wherein widths of the two sub optical waveguide portions at starting points thereof are equal to each other.

19. The mach-zehnder optical modulator as claimed in claim 16, wherein an angle between one of the sub optical waveguide portions and the outputting waveguide portion is the same as that between the other of the sub optical waveguide portions and the outputting waveguide portion.

* * * * *